(12) United States Patent
Zucker

(10) Patent No.: US 6,703,161 B2
(45) Date of Patent: Mar. 9, 2004

(54) MULTILAYER SEPARATOR FOR LEAD-ACID BATTERIES

(75) Inventor: Jerry Zucker, Charleston, SC (US)

(73) Assignee: Daramic, Inc., North Charleston, SC (US)

( * ) Notice: Subject to any disclaimer, the term of this patent is extended or adjusted under 35 U.S.C. 154(b) by 0 days.

(21) Appl. No.: 10/076,019

(22) Filed: Feb. 14, 2002

(65) Prior Publication Data

US 2003/0054236 A1 Mar. 20, 2003

Related U.S. Application Data

(63) Continuation-in-part of application No. 09/957,269, filed on Sep. 20, 2001, now abandoned.

(51) Int. Cl.$^7$ ................................................ H01M 2/16
(52) U.S. Cl. ..................................................... 429/145
(58) Field of Search ................................. 429/144, 145, 429/225, 247, 249, 254; 428/297.1, 316.6

(56) References Cited

U.S. PATENT DOCUMENTS

| | | | |
|---|---|---|---|
| 3,862,861 A | | 1/1975 | McClelland et al. .......... 136/26 |
| 4,137,377 A | * | 1/1979 | McClelland ................. 429/145 |
| 4,448,862 A | | 5/1984 | Schulte et al. ............... 429/136 |
| 4,908,282 A | | 3/1990 | Badger ......................... 429/59 |
| 5,075,183 A | | 12/1991 | Yamaguchi et al. ......... 429/139 |
| 5,376,477 A | * | 12/1994 | Aidman et al. .............. 429/141 |
| 5,470,676 A | | 11/1995 | Nakano ....................... 429/139 |
| 5,962,161 A | | 10/1999 | Zucker ........................ 429/142 |
| 6,124,059 A | | 9/2000 | Bohnstedt et al. .......... 429/252 |
| 2002/0106557 A1 | * | 8/2002 | Fraser-Bell et al. ......... 429/145 |

OTHER PUBLICATIONS

Pekala et al. ("Separators: An Overlooked Opportunity to Enhance Lithium Battery Performance?" presented at the 17th International Seminar & Exhibit on Primary and Secondary Batteries, Fort Lauderdale, Fl, Mar. 6–9, 2000).*

"A study of the effects of compressive forces applied to the plate stack on cyclability of AGM VRLA batteries"; Speaker: U.Lambert, Production and Technical Manager of Amer–Sil S.A. 37–pages. No date.

"The multi layered approach for AGM Separators"; A.L. Ferriera; Hilton Atrium Hotel, Prague, Czech Republic; Sep. 22–25, 1998; Amer–Sil S.A.; 22–Pages.

"All you ever really wanted to know about separators"; Bob Nelson; Apr. 2000; VRLA Technology; 7–Pages.

"A review of the state of the art of the VRLA battery separator"; Final Report: Oct. 2000; M.J. Weighall et al.; R/S–001 MJW Associates; pp. 1, 20–54.

"New developments in Polyethylene separators"; Entek International; Sep. 19–22, 2000; (DuraGard) 9–Pages.

"Handbook of Battery Materials"; Jurgen O. Besenhard (Ed.); pp. 245–292, 1999 no month.

* cited by examiner

*Primary Examiner*—Susy Tsang-Foster
(74) *Attorney, Agent, or Firm*—Nields & Lemack

(57) ABSTRACT

The invention concerns a battery separator comprising at least one first fibrous layer, at least one second fibrous layer, and at least one microporous polymer layer which is sandwiched between at least two fibrous layers, wherein the microporous polymer layer has an average pore size of less than 1 $\mu$m and wherein the at least one first fibrous layer has a thickness of at least 0.6 mm.

22 Claims, 1 Drawing Sheet

MULTILAYER SEPARATOR FOR LEAD-ACID BATTERIES

This application is a Continuation-in-part of U.S. patent application Ser. No. 09/957,269 filed Sep. 20, 2001 now abandoned.

FIELD OF THE INVENTION

This invention relates to novel porous separators for electric lead-acid storage batteries. According to another aspect the invention relates to lead-acid storage batteries comprising such a novel separator.

BACKGROUND OF THE INVENTION

Basically, battery separators serve as electronic insulators and ionic conductors, i.e. they prevent the direct electronic contact of electrodes of opposite polarity while enabling the ionic current between them. To meet these two functions, separators are usually porous insulators with pores as small as possible to prevent electronic short circuits by dendrites or plate particles and with a porosity as high as possible to minimize the internal battery resistance. In lead-acid batteries, the separator also determines the proper plate spacing and thereby defines the amount of electrolyte which participates in the cell reaction. The separator has to be stable over the life time of the battery, i.e. to withstand the highly aggressive electrolyte and oxidative environment.

Beyond these basically passive functions, separators in lead-acid batteries can also actively affect the battery performance in many ways. In valve regulated lead-acid (VRLA) batteries they additionally determine properties like oxygen transfer, electrolyte distribution and plate expansion. Due to their outstanding influence on the performance of VRLA batteries the separator is even referred to as the "third electrode" or "fourth active material" (Nelson B., Batteries International, April 2000, 51–60).

VRLA stands for valve-regulated lead-acid batteries which are also called sealed or recombinant batteries. In VRLA batteries oxygen, which is generated during charging at the positive electrode, is reduced at the negative electrode. Thus the battery can be charged and even be overcharged without water consumption and is therefore theoretically maintenance-free. The formation of hydrogen at the negative electrode is suppressed, for instance by using larger negative than positive plates in order to generate oxygen at the positive plate before the negative plate is fully charged.

For VRLA batteries two technologies are predominant, i.e. batteries with an absorptive glassmat (AGM) and gel batteries. In batteries with AGM, the absorptive glassmat immobilizes the electrolyte and simultaneously functions as a separator. In gel batteries, the acid is immobilized by means of fumed silica and an additional separator is required to fix the plate distance and to prevent electronic shorts. Compared to AGM batteries, the manufacturing cost of gel batteries is considered to be higher and their specific power is lower due to a higher internal resistance.

In AGM batteries the electrolyte is completely absorbed by the glass mat. AGM separators have a very high porosity in excess of 90%. This high porosity together with a good wettability is reflected in a very high acid absorption and low electrical resistance in the battery, the acid saturation of AGM separators is usually in a range of 85 to 95%. This increases the effective electrical resistance versus fully saturated separators but creates open channels of relatively large pores that enable a very efficient oxygen transfer from the positive to the negative plate. The average pore size of AGM separators is usually within the range of 3 to 15 $\mu$m with an anisotropic distribution, i.e. pore sizes of about 0.5 to 5 $\mu$m in the x-y-plane of the separator which is the plane parallel to the electrode plates and pore sizes of about 10 to 25 $\mu$m in the z-direction perpendicular to the electrodes. A potential drawback of the high oxygen transfer rate is the so-called thermal runaway, caused by the self-propelling exothermic consumption of oxygen at the negative plate and a premature capacity loss by undercharging of the negative plate.

Due to the relatively large pores and the good wettability, the wicking rate (speed of acid pick-up) of AGM is fairly high which facilitates the filling process of batteries. On the other hand a drawback of the large pores of AGM is the risk of internal short circuits caused by dendrite growth through the separator especially at low electrode plate distance and especially in cycling applications.

It was suggested to include thin microporous sheets as part of the separator system in order to control dendrite formation and oxygen transfer to the negative plate. An example of such a microporous separator is the DuraGard™ separator introduced by ENTEK International LLC (Weighall M. J.; ALABC Project R/S-001, October 2000). DuraGard™ has an average pore size of 0.014 $\mu$m and a membrane thickness of 0.10 mm (Fraser-Bell G., New developments in Polyethylene separators, Presentation at the $7^{th}$ European Lead Battery Conference, September 19–22, 2000, Dublin, Ireland).

However, if the separator has a very small pore size, it will act as a barrier to oxygen transport, and the gas will rise to the top of the plates and go over the top or around the sides of the barrier layer of the separator. This means that only the top and edges of the negative plate will participate in the oxygen reduction reaction. This is not a desirable situation as the oxidation of the pure lead in the negative plates is a highly exothermic reaction, resulting in a build up of heat in a very localised area. This results in increased danger of premature water loss and deactivation of the negative plates. It was therefore suggested to use a separator with a larger average pore size, for example a microporous PVC separator having a mean pore size of 5 $\mu$m and a thickness of 0.57 mm, sandwiched between two layers of AGM with a thickness of 0.52 mm at 10 kPa (Weighall M. J., see above; Lambert U., A study of the effects of compressive forces applied onto the plate stack on cyclability of AGM VRLA batteries, $5^{th}$ ALABC Members and Contractors' Conference Proceedings, Nice, France, Mar. 28–31, 2000). Although this separator configuration might provide for acceptable oxygen transfer and improved resistance to dendrite growth when compared to AGM separators, the pore size is still within the range of the particle size of the active material of the electrodes and thus the risk of metal particle deposition and subsequent shorting is still existing.

U.S. Pat. No. 3,862,861 describes sealed lead-acid batteries which preferably comprise separators made from fiber glass material. The edges of the negative plate are not covered by free electrolyte, i.e. the lead sponge is directly exposed to the oxygen which is said to readily react with the lead.

U.S. Pat. No. 6,124,059 describes microporous separators for sealed lead-acid batteries which essentially consist of a homogeneous mixture of a thermoplastic polymer, filler and optionally a plasticizer. The separators contain at least 20 percent by volume of pyrogenic silica and permit diffusion of the oxygen to the negative electrode. Oxygen diffusion presumable takes place through large pores which are not filled with acid.

SUMMARY OF THE INVENTION

The present invention relates to a battery separator for a lead-acid battery comprising at least one first fibrous layer, at least one second fibrous layer, and at least one microporous polymer layer which is sandwiched between two fibrous layers, wherein said microporous polymer layer has an average pore size of less than 1 μm, and wherein said at least one first fibrous layer has a thickness of at least 0.6 mm.

It is the object of the invention to provide a battery separator for a lead-acid battery with improved resistance to dendrite formation without impairing the reduction of oxygen at the negative electrode.

It is a further object of the invention to provide a battery separator which can be produced in a cost effective manner.

It is still a further object of the invention to provide an improved valve-regulated lead-acid battery with high cycling performance.

DETAILED DESCRIPTION OF THE INVENTION

Figure 1:
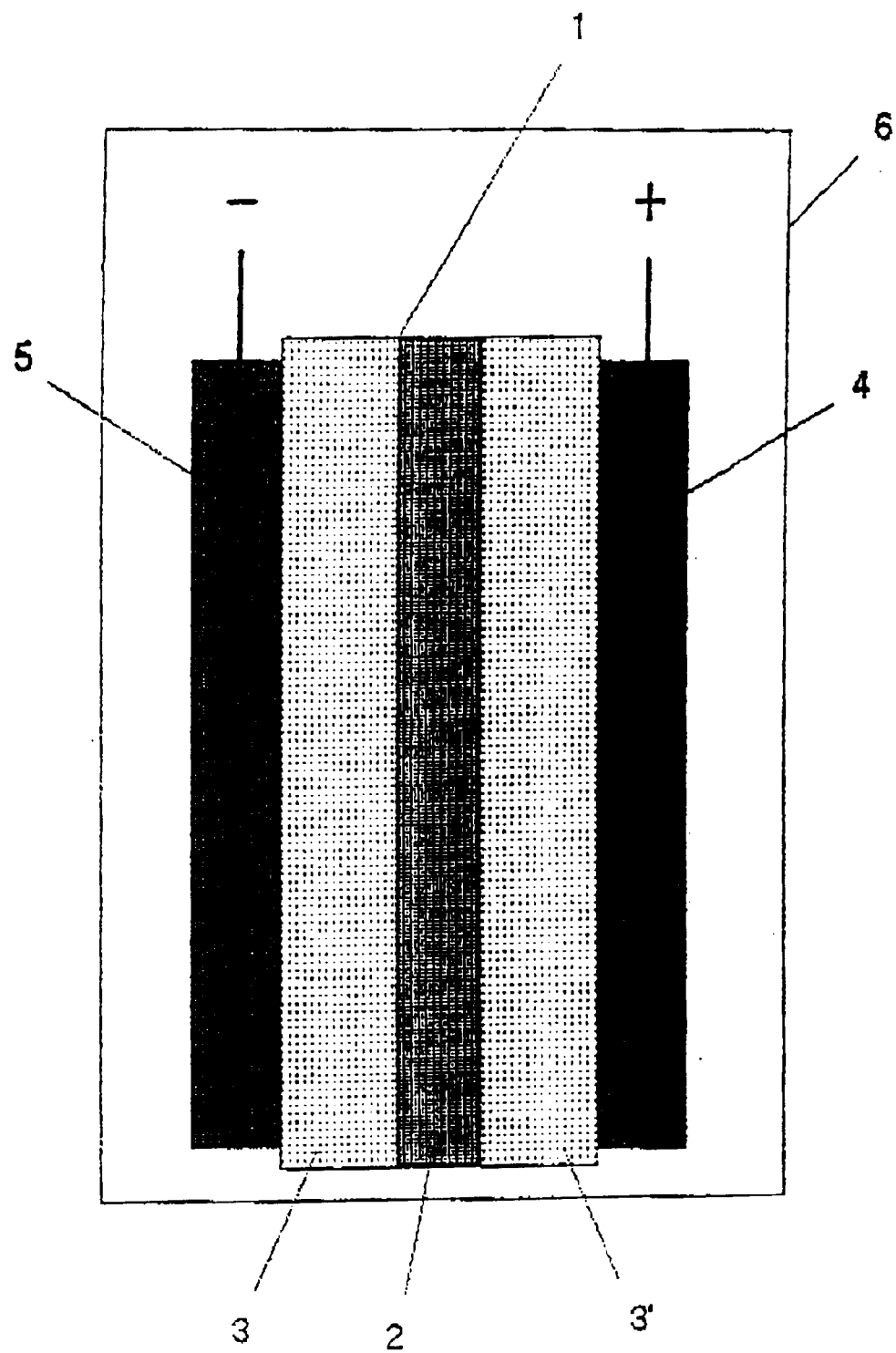
FIG. 1 is a schematic cut through a battery according to the invention.

The present invention is based on the surprising finding that separators with improved resistance to dendrite growth can be manufactured without impairing the oxygen transfer within a VRLA battery by sandwiching at least one microporous polymer layer having an average pore size of less than 1 μm between at least two fibrous layers at least one of which having a certain minimum thickness. According to a preferred embodiment the separator of the invention comprises one microporous polymer layer, one first fibrous layer and one second fibrous layer. Within the battery the separator is arranged in such a way that the first fibrous layer having a certain minimum thickness faces the negative electrode. It was found that at a certain minimum thickness of the fibrous layer at the negative electrode the separator ensures an efficient oxygen cycle without negative plate failure and without restricting the oxygen reduction reaction to the edges of the negative electrode plate. This minimum thickness was found to be 0.6 mm (determined at 10 Kpa according to the BCI Test Method; this method is described in "BCI/RBSM Standard Test Methods, Battery council International, Chicago, Ill., USA; if not stated otherwise the thickness of the fibrous layer always refers to the thickness of the dry layer). For starter batteries which are also referred to as SLI (starting-lighting-ignition) batteries the minimum thickness is preferably 0.65 mm and more preferably 0.7 mm. For the application in industrial batteries, such as motive power and stationary batteries, the minimum thickness of the fibrous layer at the negative electrode is preferably 0.8 mm and more preferably 1.0 mm.

The upper limit for the thickness of the first fibrous layer for starter batteries is preferably 1.5 mm, more preferably 0.8 am and most preferably 0.75 mm. For industrial batteries the upper limit is preferably 2.7 mm, more preferably 2.0 mm and most preferably 1.5 mm.

The second fibrous layer has preferably a thickness of 0.1 to 3.3 mm. For separators for starter batteries the second fibrous layer preferably has a thickness of 0.1 to 1.1 mm, more preferably 0.2 to 1.0 mm, and most preferably 0.25 to 0.9 mm. For industrial batteries the thickness of the second fibrous layer is preferably within the range of 0.5 to 3.3 mm, more preferably 0.75 to 3.1 mm, and most preferably 1.0 to 2.8 mm.

In the following, embodiments of the present invention will be described in detail with reference to the accompanying drawing. FIG. 1 shows a separator 1 of the present invention. The separator comprises a microporous polymer layer 2, a first fibrous layer 3 and a second fibrous layer 3'. Also shown are the positive electrode 4 and the negative electrode 5 of the battery. The electrodes 4 and 5 as well as the separator 1 are contained in a closed case 6.

The microporous polymer layer 2 is preferably made of a synthetic resin such as polyolefin, polyvinyl chloride) or other suitable material which is compatible with the battery environment where it is to be used. The preferred separator material is polyolefin, such as polypropylene, ethylene-butene copolymer, and preferably polyethylene, more preferably high molecular weight polyethylene, i.e. polyethylene having a molecular weight of at least 600,000, even more preferably ultra high molecular weight polyethylene, i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

The microporous polymer layer preferably comprises a homogeneous mixture of 8 to 100 vol. % of polyolefin, 0 to 40 vol. % of a plasticizer and 0 to 92 vol. % of inert filler material. The preferred filler is dry, finely divided silica. The preferred plasticizer is petroleum oil. Since the plasticizer is the component which is easiest to remove from the polymer-filler-plasticizer composition, it is useful in imparting porosity to the battery separator. The final composition of the separator will depend upon the original composition and the component or components extracted. Materials of this kind are well-known in the art and described for example in U.S. Pat. No. 3,351,495 the disclosure of which is incorporated herein by reference.

The microporous polymer layer has an average pore size of less than 1 μm in diameter. Preferably more than 50% of the pores are 0.5 μm or less in diameter. It is especially preferred that at least 90% of the pores have a diameter of less than 0.5 μm. The microporous polymer layer preferably has an average pore size within the range of 0.05 to 0.5 μm, preferably 0.1 to 0.2 μm.

Unless otherwise stated, the pore size of the fibrous and microporous polymer layers is measured using the mercury intrusion method described in Ritter, H. L., and Drake, L.C., Ind. Eng. Chem. Anal. Ed., 17, 787 (1945). According to this method, mercury is forced into different sized pores by varying the pressure exerted on the mercury by means of a porosimeter (porosimeter model 2000, Carlo Erba). The pore distribution is determined by evaluation of the crude data with the MILESTONE 200 software. The pore size of the micropores of the polymer layer is measured before forming the holes.

The average pore size is defined as the pore size at which 50% of the total pore volume as determined by the mercury intrusion method is contained in smaller pores and 50% in larger pores.

The thickness of the microporous polymer layer is preferably greater than 0.1 mm and less than or equal to 0.6 mm. Preferably, the thickness of the microporous polymer layer is within the range of 0.15 to 0.25 mm and most preferably is about 0.2 mm.

The fibrous layers 3 and 3' can be made of glass fibers, polymeric fibers or a mixture of glass fibers and polymeric fibers. Suitable mats made of polymer fibers which may be used as fibrous layers in the present invention are disclosed in U.S. Pat. No. 5,962,161, the disclosure of which is incorporated herein by reference.

The preferred material is glass. Generally all glass fiber materials known in the art for producing absorptive glassmat (AGM) separators may be used for forming the fibrous layers of the present invention. A preferred fibrous material are absorptive microfiber glass fleeces without organic components like binder or polymeric fibers. It is preferred that the fibers have a diameter ranging from 0.1 to 10 $\mu$m, more preferably from 0.1 to 5 $\mu$m. The fibers are preferably blends of acid resistant glass fibers of various diameter, usually extremely thin fibers with an average fiber diameter below 1 $\mu$m, referred to as microfibers, and "coarse" fibers with an average diameter of approx. 3 $\mu$m. The microfibers increase the internal surface, improve the tensile strength and decrease the pore diameter but significantly increase the product cost. The larger fibers facilitate the battery filling by creating larger pores with faster acid pick-up, often referred to as wicking rate.

The fibrous glass layers preferably comprise 20 to 40% by weight of glass microfibers having an average diameter of less than 1 $\mu$m and 60 to 80% by weight of coarse glass fibers having an average diameter of about 3 $\mu$m, for instance 30% by weight microfibers and 70% by weight coarse fibers. Suitable glass fiber mats and the preparation thereof are well known to a person skilled in the art (see for instance Böhnstedt W., in Handbook of Battery Materials, Editor Besenhard J. O., Wiley-VCH, Weinheim 1999, pages 245 to 292 and literature cited therein).

Preferred fibrous layers made of polymer fibers comprises a nonwoven web, mat or fleece of fibers of a diameter of 0.1 to 10 $\mu$m, preferably 0.1 to 5 $\mu$m. It is preferred that more than 10% by weight of the fibers, more preferably more than 15% by weight of the fibers and most preferably 20 to 40% by weight of the fibers have a diameter smaller than 1 $\mu$m, preferably about 0.1 $\mu$m, and it is further preferred that at least 60% by weight of the fibers have diameters of less than 5 $\mu$m. The fibers are made of a thermoplastic polymer, which is preferably selected from the group consisting of polyolefins, polystyrenes, polyamides, polyesters, halogenated polymers, and the respective copolymers, more preferably polyolefins and in particular polyethylenes and polypropylenes. To render the fibrous layer wettable, a suitable surface active agent is added to the polymer prior to extrusion or hydrophilic groups are covalently bonded to the surface of the fibers after formation. Suitable treatments are described in U.S. Pat. No. 5,962,161, the disclosure of which is incorporated herein by reference. Nonwoven mats of this type can be manufactured by extrusion and blowing processes. One preferred way is described in U.S. Pat. No. 6,114,017, which comprises melting a polymer by polymer heating and extrusion means, extruding said polymer at flow rates of less than 1 g/min/hole through polymer orifices arranged in one or more spaced apart cross directional rows on one or more modular dies heated by a heating unit, wherein the diameters of said orifices may be equal to each other or may differ from row to row to obtain a web comprising fibers of essentially uniform or varying diameter, blowing said polymer extrudate using heated air of at least 95° C. from two or more constant or variable cross-section air jets per polymer orifice, preferably variable cross-section air jets being converging-diverging nozzles capable of producing supersonic drawing velocities, or tempered air between 10° C. and 375° C. of two or more continuous converging-diverging nozzle slots placed adjacent and essentially parallel to said polymer orifice exits to attenuate said filaments and to produce essentially continuous polymer filaments, and depositing said liberized polymer on a collecting means to form a self-bonded web consisting of as many layers of disbursed continuous polymer filaments as the number of rows of said polymer orifices in said die. U.S. Pat. No. 5,679,379 discloses modular die units suitable for the production of the above nonwoven mats. The disclosure of both U.S. Pat. Nos. 6,114,017 and 5,679,379 is incorporated herein by reference. The self-bonded webs produced in the above process may also be thermally bonded to provide even greater strength by using conventional hot calendering techniques where the calender rolls may pattern engraved or flat. The nonwoven webs, mats or fleeces have low average diameters, improved uniformity, a narrow range of fiber diameters, and significantly higher unbonded strength than a typical meltblown web. When the material is thermally bonded it is similar in strength to spunbonded nonwovens of the same polymer and basis weight.

When a mixture of glass fibers and polymeric fibers is used, the different fibers are preferably used in such proportions that the sheet has an absorbency with respect to the electrolyte of from 75 to 95% in the absence of a surfactant. Preferably the glass and polymeric fibers defined above are used. Fibrous sheets of this type may be prepared by the methods disclosed in U.S. Pat. No. 4,908,282, the disclosure of which is incorporated herein by reference.

The fibrous layer preferably has an average pore size of 3 to 15 $\mu$m, more preferably 5 to 12 $\mu$m and most preferably 6 to 10 $\mu$m.

At a thickness of 0.6 mm at 10 kPa, absorptive glass materials typically have a basis weight of 100 g/ml and a porosity of 93 to 95%. The BET surface area of the fibrous layer is preferably within the range of 0.5 to 2.5 m$^2$/g, more preferably 1.1 to 1.3 m$^2$/g. These parameters are determined according to well established procedures (e.g. BCI Test Methods, see above).

Nonwoven webs of polymer fibers, at a thickness of 0.6 mm at 10 kPa, typically have a basis weight of 70 g/m$^2$ and a porosity of 91 to 95%. The BET surface area of the fibrous layer is preferably within the range of 1 to 5 m$^2$/g, more preferably 2 to 3 m$^2$/g. These parameters are determined as described above (e.g. BCI Test Methods). At a thickness of 0.6 mm at 10 kPa, fibrous sheets comprising a mixture of 85% by weight of glass fibers having a thickness of 0.1 to 10 $\mu$m and 15% by weight of polymeric fibers having a thickness of 0.1 to 10 $\mu$m, typically have a basis weight of 90 to 95 g/m$^2$ and a porosity of 91 to 95%. The BET surface area of the fibrous layer is preferably within the range of 1 to 3 m$^2$/g, more preferably 1.1 to 2.5 m$^2$/g. These parameters are determined as described above (e.g. BCI Test Methods).

As explained above it is of critical importance that the first fibrous layer 3 at the negative electrode has a certain minimum thickness. Otherwise the thickness of the various layers is determined by the desired total thickness of the separator. Separators for starter batteries preferably have a total thickness of 0.8 to 1.8 mm, preferably 1.2 mm; separators for industrial lead-acid batteries of about 2 to 4 mm, preferably 2.5 mm. Instead of a single fibrous layer having a thickness of e.g. 2.0 mm two or more adjacent fibrous layers having a total thickness of 2.0 mm may be used. The thickness is determined at 10 Kpa using the BCI method (see above).

The fibrous and microporous polymer layers are formed into separators by laminating. The various layers can be bonded together by glueing, preferably by acrylate glue, ultrasonic sealing or sewing.

The separators of the present invention can be provided either in sheet form or in the form of a pocket with an open top, a closed bottom and closed sides. Accordingly it is preferred embodiment that the microporous polymer layer is larger than the fibrous layers. Thus, when combining the microporous polymer layer and the fibrous layers, the fibrous layers do not completely cover the microporous layer. It is preferred that at least two opposing edge regions of the microporous polymer layer remain uncovered to provide edges for heat sealing which facilitates the formation of pockets. In addition, the uncovered edge regions allow full edge ribbon sealing of the separator which is advantageous in the formation of spiral wound cells. The manufacture of pockets as well as spiral wound cells is well known to a person skilled in the art.

It is evident that a separator according to the invention can also be prepared in situ, e.g. by individually separating the positive and negative electrodes with AGM separators or other fibrous layers and combining the separated electrode plates with a microporous polymer layer or pocket during assembly of the battery. Thus, batteries can be formed by a method comprising the steps of providing at least one first electrode plate with a fibrous layer wrap, for instance by folding an AGM mat in the middle and placing an electrode in the folded AGM mat, pocketing the at least one fibrous layer wrapped electrode plate in a pocket made of microporous polymer material, combining the pocketed electrode plate with at least one second electrode plate which is wrapped in a fibrous layer, introducing the at least one first and at least one second electrode plates into a suitable case, introducing into the case a suitable quantity of electrolyte, and closing the case. The at least one first and said at least one second electrode plates are arranged in such a way that the fibrous layers and microporous polymer layers form at least one separator according to the present invention. Usually 4 to 8 first and 4 to 9 second electrode plates are combined in one cell and several cells are connected to give a battery.

The separators of the present invention can be prepared at considerably lower costs than separators according to the prior art based on pyrogenic silica or AGM with a large portion of microfibers. Besides improved resistance to lead deposits and microshorts the separators of the invention show good oxygen transfer which helps to prevent premature failure of the battery. In addition, the microporous polymer layer improves the tensile strength of AGM separators or other separators consisting of fibrous layers. The separators of the present invention can therefore be processed at higher speeds than common AGM and other fibrous layer separators and thus the manufacture of lead-acid batteries, such as spiral wound cells, is significantly accelerated. Moreover, the microporous polymer layer improves the compressive properties of AGM and other fibrous layers and ensures a more uniform compression.

The invention further pertains to a valve-regulated lead-acid battery comprising at least two oppositely charged electrodes in a closed case, a body of an electrolyte and a separator between adjacent ones of said electrodes, wherein said separator is a separator as defined above. The separator is arranged in such a way that the fibrous layers of the separator are in contact with said electrodes, the first fibrous layer having a thickness of at least 0.6 mm facing the negative electrode. The electrolyte is preferably totally absorbed by the separator and the electrode plates.

The invention will be more fully understood from the following example, which is presented solely for the purpose of illustrating and disclosing, and is not to be construed as limiting.

EXAMPLE

A microporous filled UHMW polyethylene membrane having a thickness of 0.2 mm and an average pore size of 0.1 $\mu$m (Daramic™ 200 HP; Daramic, Inc.) was sandwiched between two glass fiber layers. The polyethylene used in this example had an average molecular weight of 7 million, a standard load melt index of 0, and a viscosity number of 3000 ml/g. The polyethylene was filled with 60% by weight of silica.

The glass fiber layers were made of about 35% by weight of glass fibers having a thickness of up to 1 $\mu$m and about 65% by weight of glass fibers having a thickness of about 3 $\mu$m. The fiber layers had a porosity of about 95%, an average pore size of 12 $\mu$m, and a BET surface area of 1.1 $m^2/g$ (Hovosorb™ BG 13005 and BG 14005; Rollingsworth & Vose Co.).

The microporous polyethylene layer was laminated with a first glass fiber layer having a thickness of 0.89 mm (Hovosorb™ BG 14005) and a second glass fiber layer having a thickness of 0.86 mm (Hovosorb™ BG 13005; each at 10 Kpa). The first and second glass fiber layer were applied to one each side of the polyethylene layer by a stripe of adhesive (acrylate glue, Rhoplex™ N-495). The final three-layer separator had a thickness of 2.0 mm (at 10 Kpa) and a size of about 185 mm×330 mm.

What is claimed is:

1. A lead-acid battery separator comprising at least one first fibrous layer having a thickness of at least 0.6 mm, at least one second fibrous layer, and at least one microporous polymer layer which is sandwiched between at least two fibrous layers and has an average pore size of less than 1 $\mu$m, wherein the fibrous layers either:
   a) essentially consist of polymeric fibers and comprise polymeric fibers having a diameter of 0.1 to 10 $\mu$m; or
   b) comprise a mixture of glass fibers and polymeric fibers and comprise glass fibers having a diameter of 0.1 to 10 $\mu$m and/or polymeric fibers having a diameter of 0.1 to 10 $\mu$m.

2. A battery separator according to claim 1, wherein the microporous polymer layer is a polyolefin layer.

3. A battery separator according to claim 2, wherein the polyolefin has a molecular weight of at least 600,000, a standard load melt index of substantially 0, and a viscosity number of not less than 600 ml/g.

4. A battery separator according to claim 2, wherein the polyolefin is polyethylene.

5. A battery separator according to claim 1, wherein more than 50% of the pores of the microporous polymer layer are 0.5 $\mu$m or less in diameter.

6. A battery separator according to claim 1, wherein the microporous polymer layer has a thickness which is greater than 0.1 mm and less than or equal to 0.6 mm.

7. A battery separator according to claim 1, wherein the fibrous layers essentially consist of polymeric fibers and at least 10% by weight of the polymeric fibers of the fibrous layers have diameters of less than 1 $\mu$m and at least 60% by weight of the polymeric fibers have diameters of less than 5 $\mu$m.

8. A battery separator according to claim 7, wherein at least 15% by weight of the polymeric fibers have diameters of less than 1 $\mu$m.

9. A battery separator according to claim 8, wherein the fibrous layers comprise 20 to 40% by weight of polymeric microfibers having an average diameter of less than 1 μm.

10. A battery separator according to claim 1, wherein the fibrous layers essentially consist of polymeric fibers and the polymeric fibers have diameters ranging from 0.1 to 5 μm.

11. A battery separator according to claim 1, wherein the fibrous layers essentially consist of polymeric fibers and the polymeric fibers are polyolefin fibers.

12. A battery separator according to claim 11, wherein the polyolefin is polyethylene and/or polypropylene.

13. A battery separator according to claim 1, wherein the fibrous layers comprise a mixture of glass fibers and polymeric fibers and the glass fibers have diameters ranging from 0.1 to 5 μm.

14. A battery separator according to claim 1, wherein the fibrous layers comprise a mixture of glass fibers and polymeric fibers and the polymeric fibers have diameters ranging from 0.1 to 5 μm.

15. A battery separator according to claim 1, wherein the fibrous layers comprise a mixture of glass fibers and polymeric fibers and the polymeric fibers are polyolefin fibers.

16. A battery separator according to claim 15, wherein the polyolefin is polyethylene and/or polypropylene.

17. A battery separator according to claim 1, comprising a first fibrous layer having a thickness of 0.6 to 2.7 mm.

18. A battery separator according to claim 1, comprising a first fibrous layer having a thickness of 0.6 to 1.5 mm.

19. A battery separator according to claim 1, comprising a second fibrous layer having a thickness of 0.1 to 3.3 mm.

20. A battery separator according to claim 1, having the form of a pocket with an open top, a closed bottom and closed sides.

21. A valve-regulated lead-acid battery comprising at least two oppositely charged electrodes in a closed case, a body of an electrolyte and a separator between adjacent ones of said electrodes, wherein said separator is a separator according to claim 1 and wherein said separator is arranged in such a way that the fibrous layers of the separator are in contact with said electrodes, the first fibrous layer having a thickness of at least 0.6 mm facing the negative electrode.

22. A method of producing a lead-acid battery, said method comprising the steps of providing at least one first electrode plate with a fibrous layer wrap, pocketing the at least one electrode plate wrapped in a fibrous layer in a pocket made of microporous polymer material, combining the pocketed electrode plate with at least one second electrode plate which is wrapped in a fibrous layer, introducing the at least one first and at least one second electrode plate into a suitable case, introducing into the case a suitable quantity of electrolyte, and closing the case, said at least one first and at least one second electrode plate being arranged in such a way that the fibrous layers and microporous polymer layers form at least one separator according to claim 1.

* * * * *